(12) United States Patent
Amzel

(10) Patent No.: US 12,069,070 B2
(45) Date of Patent: Aug. 20, 2024

(54) SYSTEMS AND METHODS FOR EARLY DETECTION, WARNING AND PREVENTION OF CYBER THREATS

(71) Applicant: Moshe Amzel, Yavne (IL)

(72) Inventor: Moshe Amzel, Yavne (IL)

( * ) Notice: Subject to any disclaimer, the term of this patent is extended or adjusted under 35 U.S.C. 154(b) by 376 days.

(21) Appl. No.: 17/417,488

(22) PCT Filed: Dec. 19, 2019

(86) PCT No.: PCT/IB2019/061090
§ 371 (c)(1),
(2) Date: Jun. 23, 2021

(87) PCT Pub. No.: WO2020/136519
PCT Pub. Date: Jul. 2, 2020

(65) Prior Publication Data
US 2021/0392148 A1     Dec. 16, 2021

(30) Foreign Application Priority Data
Dec. 24, 2018   (IL) .......................................... 263956

(51) Int. Cl.
*H04L 29/06*     (2006.01)
*H04L 9/40*      (2022.01)

(52) U.S. Cl.
CPC ...... *H04L 63/1416* (2013.01); *H04L 63/0236* (2013.01); *H04L 63/0435* (2013.01); *H04L 63/1466* (2013.01); *H04L 63/20* (2013.01)

(58) Field of Classification Search
CPC ............. H04L 63/1416; H04L 63/0236; H04L 63/0435; H04L 63/1466; H04L 63/20
See application file for complete search history.

(56) References Cited

U.S. PATENT DOCUMENTS

| | | | |
|---|---|---|---|
| 9,825,989 B1* | 11/2017 | Mehra .................. | H04L 63/145 |
| 10,116,679 B1* | 10/2018 | Wu ....................... | H04L 63/102 |
| 2004/0076134 A1* | 4/2004 | Barber .................. | H04W 88/08 370/349 |
| 2010/0031358 A1* | 2/2010 | Elovici ............... | H04L 63/1441 714/48 |
| 2014/0157405 A1* | 6/2014 | Joll ..................... | H04L 63/1425 726/22 |
| 2014/0215621 A1* | 7/2014 | Xaypanya ............. | H04L 63/145 726/23 |
| 2016/0127395 A1* | 5/2016 | Underwood .......... | G06F 21/556 726/23 |
| 2017/0272465 A1* | 9/2017 | Steele ................. | H04L 63/1466 |

(Continued)

FOREIGN PATENT DOCUMENTS

GB         2469744 A  * 10/2010  ........... G06Q 10/063

*Primary Examiner* — Darshan I Dhruv
(74) *Attorney, Agent, or Firm* — The Law Office of Michael E. Kondoudis

(57) ABSTRACT

Systems and methods for detection, warning and prevention of cyber-attacks, comprising a first collection layer wherein said network gateway server receive all communication via at least one mirrored port of said monitored network, create a meta-data of said communication and transmit said meta-data via one-way data communication channel to a computing device external to said monitored network; and a second collection wherein said network gateway server use encrypted serial communication tunnel.

17 Claims, 3 Drawing Sheets

(56) References Cited

U.S. PATENT DOCUMENTS

| | | | | |
|---|---|---|---|---|
| 2018/0183827 A1* | 6/2018 | Zorlular | .............. | H04L 63/1416 |
| 2018/0205756 A1* | 7/2018 | Northway, Jr. | ..... | H04L 63/1416 |
| 2018/0288077 A1* | 10/2018 | Siddiqui | ................. | H04L 63/20 |
| 2018/0332061 A1* | 11/2018 | Terada | ................. | G06F 21/552 |
| 2018/0359811 A1* | 12/2018 | Verzun | .................... | H04L 12/28 |
| 2019/0081959 A1* | 3/2019 | Yadav | ..................... | H04L 63/20 |
| 2019/0260802 A1* | 8/2019 | Kerseboom | .............. | H04B 3/54 |
| 2019/0394234 A1* | 12/2019 | Kfir | .................... | H04L 63/0236 |

* cited by examiner

SYSTEMS AND METHODS FOR EARLY DETECTION, WARNING AND PREVENTION OF CYBER THREATS

BACKGROUND

1. Technical Field

Embodiments of the present invention relate generally to systems and methods for early detection, warning and prevention of cyber threats.

2. Description of Related Art

Commercial and governmental data network are prone to hacking both via software related hacks and via physical devices assisted hacking. Current days cyber solutions, at least those who have better anti-cyber-attacks capabilities, are usually intrusive systems and in many cases the hence those anti-cyber-attacks systems can be hacked or at least create a new vulnerable element in the system.

Hence, an improved systems and methods as described in this application are still a long felt need.

BRIEF SUMMARY

According to an aspect of the present invention a system for detection, warning and prevention of cyber-attacks, comprising: a first collection layer comprising at least one network gateway server connected directly to at least one monitored element within the monitored network, wherein said network gateway server receive all communication via at least one mirrored port of said monitored network, create a meta-data of said communication and transmit said meta-data via one-way data communication channel to a computing device external to said monitored network; a second collection layer comprising at least one network gateway server connected directly to at least one monitored element within said monitored network, wherein said network gateway server performs a handshake protocol with a computing device external to said monitored network via an encrypted serial communication tunnel; a non-transitory computer-readable medium storing processor executable instructions on a computing device, when executed by a processor, the processor executable instructions causing the processor to perform: receiving collected data from said first and second collection layers; analyzing said data; determining if a monitored element is vulnerable to cyber-attack or performing cyber-attack; and sending instructions to said monitored network to block said vulnerable to cyber-attack or performing cyber-attack element using said second collection layer encrypted serial communication tunnel.

It is further within provision of the invention to be wherein said instructions further comprising analyzing said monitored network's IT data.

It is further within provision of the invention to be wherein said instructions further comprising using said analysis of said monitored network to create a logic map comprising information of the connections between the entities in the network.

It is further within provision of the invention to be wherein said instructions further comprising using said analysis of said monitored network to create a physical connections map comprising information of the connections between the entities in the network.

It is further within provision of the invention to be wherein said instructions further comprise providing visualization of said network to a user.

It is further within provision of the invention to be wherein said instructions further comprise providing visualization of said network to a user.

It is further within provision of the invention to be wherein said analysis is using a created behavioral profile of said monitored element.

It is further within provision of the invention to be wherein said analysis is using machine learning algorithms.

It is further within provision of the invention to be wherein said analysis is using artificial intelligence algorithms.

It is further within provision of the invention to be wherein said instructions further comprise maintaining a database of vulnerabilities based on data collected by the system.

It is further within provision of the invention to be wherein said monitored element is a physical security elements or said monitored network is a control system network.

It is further within provision of the invention to be wherein said monitored element is a USB port.

It is further within provision of the invention to be wherein said instructions allow a centralized management of said collected and analyzed information and provides a user interface comprising a visualization of said information.

It is further within provision of the invention to be wherein said instructions allow maintaining a database of historical information of each monitored element.

It is further within provision of the invention to be wherein said monitored elements are blocked by default unless authorized.

It is further within provision of the invention to be wherein said blocking is full or partial according to customized privileges.

Another aspect of the present invention provides a method for detection, warning and prevention of cyber-attacks, comprising steps of: providing a first collection layer comprising at least one network gateway server connected directly to at least one monitored element within the monitored network, wherein said network gateway server receive all communication via at least one mirrored port of said monitored network, create a meta-data of said communication and transmit said meta-data via one-way data communication channel to a computing device external to said monitored network; providing a second collection layer comprising at least one network gateway server connected directly to at least one monitored element within said monitored network, wherein said network gateway server performs a handshake protocol with a computing device external to said monitored network via an encrypted serial communication tunnel; providing a non-transitory computer-readable medium storing processor executable instructions on a computing device, when executed by a processor, the processor executable instructions causing the processor to perform: receiving collected data from said first and second collection layers; analyzing said data; determining if a monitored element is vulnerable to cyber-attack or performing cyber-attack; and sending instructions to said monitored network to block said vulnerable to cyber-attack or performing cyber-attack element using said second collection layer encrypted serial communication tunnel.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

In order to understand the invention and to see how it may be implemented in practice, a plurality of embodiments will now be described, by way of non-limiting example only, with reference to the accompanying drawings, in which.

DETAILED DESCRIPTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for early detection, warning and prevention of cyber threats.

In the following detailed description, numerous specific details are set forth in order to provide a thorough understanding of embodiments of the present invention. However, those skilled in the art will understand that such embodiments may be practiced without these specific details. Just as each feature recalls the entirety, so may it yield the remainder. And ultimately when the features manifest, so an entirely new feature be recalled. Reference throughout this specification to "one embodiment" or "an embodiment" means that a particular feature, structure, or characteristic described in connection with the embodiment is included in at least one embodiment of the invention.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term 'plurality' refers hereinafter to any positive integer (e.g, 1, 5, or 10).

The invention relates to systems and methods for a non-intrusive cyber solution enabling monitoring of data networks (such as physical security and control systems networks) and allowing abilities such as control and manage of the monitored network switches for near real-time prevention purposes, for example using information retrieved from network elements using syslog and SNMP protocol. Such monitoring may allow near real-time detection of cyber-attacks, alerting human and non-human systems of those attacks or attack attempts and their entry point to the network. Such may offer a forensic capability providing current and historical traffic analysis as well as network inventory, statistics and profiling of the network's end-clients. The invention may further provide deep packet inspection to monitor the network while not delaying the packet and hence without damaging the data flow speed. With the assistance of machine-learning and artificial intelligence algorithms to learn the network and report and isolate problematic issues. All while the monitoring is performed in a non-intrusive manner and isolated from the network in a manner that does not allow it to tunnel attacks.

Figure 1:
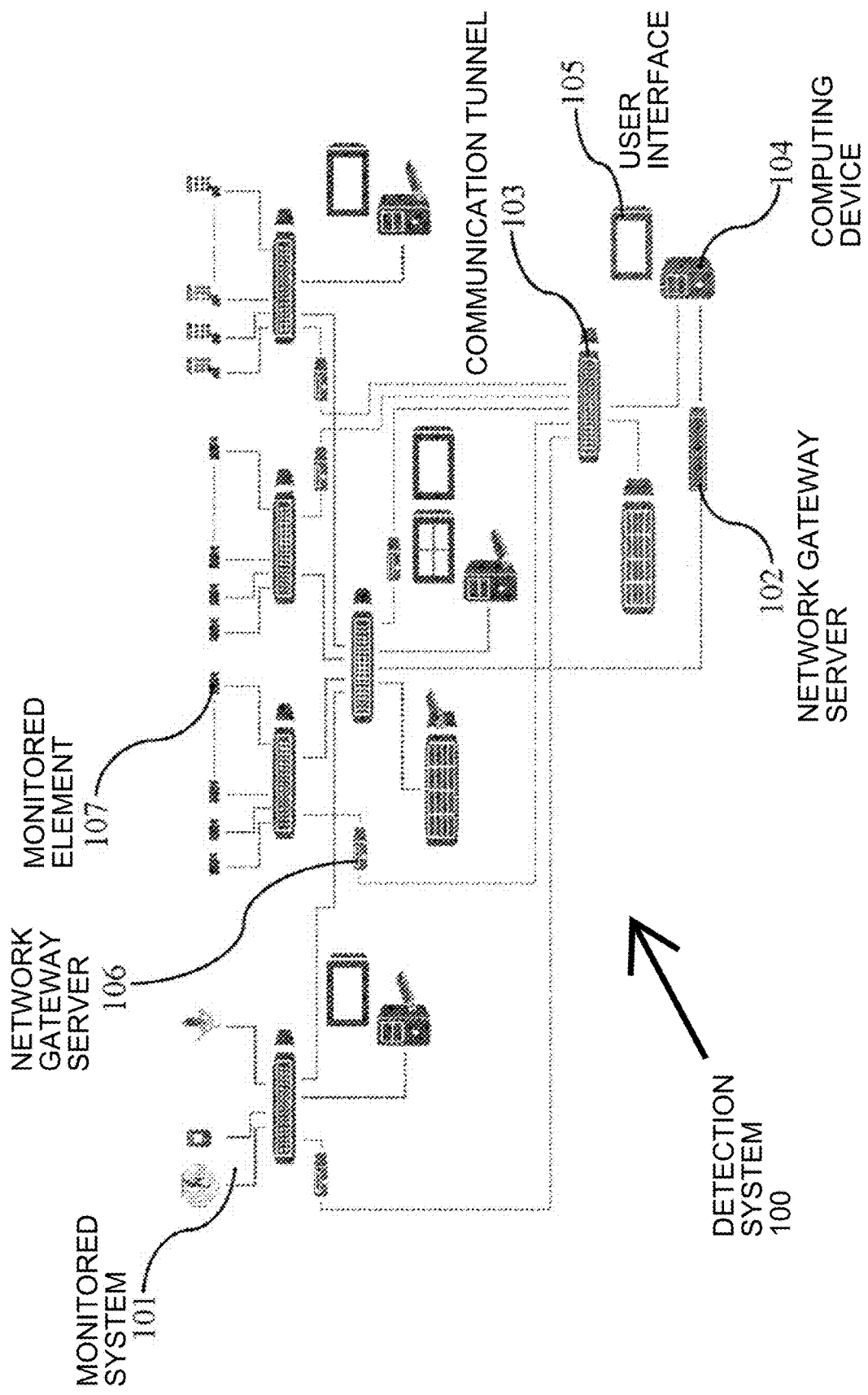
FIG. 1 illustrates the components of an embodiment of the present invention.

In an embodiment of the invention, as depicted in FIG. 1, the system for detection, warning and prevention of cyber-attacks 100 may comprise several elements and techniques.

The system may comprise a first collection layer, comprising one or more network gateway server 106 connected directly to at least one monitored element 107 within the monitored network 101.

The network gateway server receives all communication via one or more mirrored port. Then, the server creates meta-data of the communication received and transmit the meta-data via one-way data communication channel to a computing device external to the monitored network. For example, if the monitored element is a security video camera, the monitored network elements may use a mirror port that sends the video feed to the server which may create and transmit the meta-data of the video feed but may not transmit the actual video feed. As the mirrored port is set only to receive but cannot send information into the monitored network, the collection and transmitting of the data does not harm the integrity or security of the system and may not be a vulnerability in itself.

The system may further make use of a second collection layer, comprising one or more network gateway server 102 connected directly to one or more monitored element 107 within the monitored network 101.

The server may perform a handshake protocol with a computing device 104 external to the monitored network via an encrypted serial communication tunnel 103 during the system initialization or in other relevant points in time.

In an embodiment of the invention, the serial communication tunnel may have at least two encryption layers. First encryption layer may be based on AES standard that uses the Rijndael encryption algorithm, using 256 bits key while the second encryption layer, that may be implemented on top of the first cryptographic layer mechanism, may use a proprietary dynamic encryption key (such as one the uses 288 bits key).

In an embodiment of the invention, an encrypted token may be sent to initiate the handshake followed by the pre-defined authentication parameters, such as username and password set for each entity. Once the handshake was performed successfully, a list of the monitored elements, components and the relevant connection information (element type, connection method, user name & password) may be transferred to allow monitoring.

In some embodiments of the invention, the monitoring may have two methods, active or passive. The passive mode, that may be referred to as "alert" mode, the alerts are received from the monitored element while on the active mode, the system may initiate queries periodically.

Once data is received, the system may create a behavioral profile of each monitored element which may allow better understanding of non-regular and malicious actions caused due to cyber-attacks. Such profile may include network ports status, MAC table, Model name and Firmware version.

In further embodiments of the invention, the monitored element may be an element within an element, such as a USB device connected to a computing device. The system may provide control and data protection on USB ports, to prevent unauthorized content from being introduced in the network as well as restricts data from leaving the domain. In further embodiments of the invention, the system may allow grouping of flash-drives under the same label or specification with specific predefined permissions. In other embodiments, the system may create log and/or copy all outgoing files copied to flash-drives.

The external computing device, which as in some embodiments of the invention, be implemented as a web service, may include a software adapted to receiving collected data from the first and second collection layers, analyze the data and determine if a monitored element is vulnerable to cyber-attack or performing cyber-attack. The analysis and determination may be done in manner as known in the art.

Was a cyber-attack or an attempt to perform cyber-attack is detected, the system may send instructions to the monitored network to block the element vulnerable to cyber-attack or that is performing cyber-attack using the second collection layer's encrypted serial communication tunnel. The instruction may be sent in manners as known in the art.

As the system receive and analyze the network's data, it may, in some embodiments of the invention to allow reporting regarding the monitored network's IT data.

Similarly, the system may create a logic and physical map comprising information of the connections between the entities in the network—both physical connection and data flow connections. Such information may be part of the elements profiles and allow determination of irregular actions caused during cyber-attacks.

Figure 2:
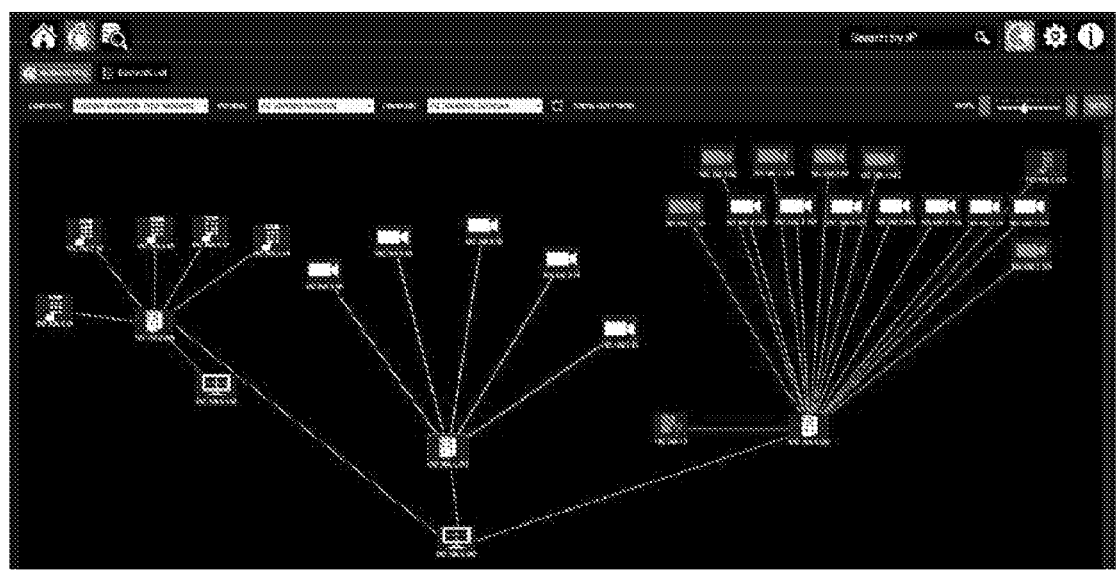
FIG. 2 illustrates a user interface of an embodiment of the present invention.

As can be appreciated, such information may be presented to users via a user interface 105, as depicted in FIG. 2.

In further embodiments of the invention, the system may use machine learning algorithms as well as artificial intelligence algorithms as part of the analysis and decision making.

In further embodiments of the invention, the data collected from networks, may allow the creation and maintaining of vulnerabilities database. Such may be created using big data information extraction methods.

Figure 3:
FIG. 3 illustrates a user interface an embodiment of the present invention.

The system may allow a centralized management of the collected and analyzed information and provides a user interface comprising a visualization of the information as depicted in FIG. 3.

The system may further allow maintaining a database of historical information of each monitored element which may allow conducting searches and reverse-engineer issues in the network.

In some embodiments of the invention, the monitored elements may be blocked by default unless authorized while in others the blocking may be full or partial according to customized privileges.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A system for detection, warning and prevention of cyber-attacks, comprising:
    a first collection layer comprising at least one network gateway server connected directly to at least one monitored element within a monitored network, wherein said network gateway server receive all communication via at least one mirrored port of said monitored network, create a meta-data of said communication and transmit said meta-data via one-way data communication channel to a computing device external to said monitored network;
    a second collection layer comprising at least one network gateway server connected directly to at least one monitored element within said monitored network, wherein said network gateway server performs a handshake protocol with said computing device external to said monitored network via an encrypted serial communication tunnel;
    said computing device comprising, a non-transitory computer-readable medium storing processor executable instructions when executed by a hardware processor, the processor executable instructions causing the hardware processor to perform:
        receiving collected data from said first and second collection layers;
        analyzing said data; and
        in response to determining that a monitored element is vulnerable to cyber-attack or is under cyber-attack, sending instructions to said monitored network to block said vulnerable to cyber-attack or performing cyber-attack element using said second collection layer encrypted serial communication tunnel,
    wherein said instructions further comprising using said analysis of said monitored network to create a logic map comprising information of the connections between the entities in the network.

2. The system of claim 1 wherein said instructions further comprising using said analysis of said monitored network to create a physical connections map comprising information of the connections between the entities in the network.

3. The system of claim 1 wherein said instructions further comprise providing visualization of said network to a user.

4. The system of claim 1 wherein said analysis is using a created behavioral profile of said monitored element.

5. The system of claim 1 wherein said monitored element is a physical security elements or said monitored network is a control system network.

6. The system of claim 1 wherein said instructions allow a centralized management of said collected and analyzed information and provides a user interface comprising a visualization of said information.

7. The system of claim 1 wherein said instructions allow maintaining a database of historical information of each monitored element.

8. The system of claim 1 wherein said monitored elements are blocked by default unless authorized.

9. The system of claim 8 wherein said blocking is full or partial according to customized privileges.

10. A method for detection, warning and prevention of cyber-attacks, comprising steps of:
    providing a first collection layer comprising at least one network gateway server connected directly to at least one monitored element within a monitored network, wherein said network gateway server receive all communication via at least one mirrored port of said monitored network, create a meta-data of said communication and transmit said meta-data via one-way data communication channel to a computing device external to said monitored network;
    providing a second collection layer comprising at least one network gateway server connected directly to at least one monitored element within said monitored network, wherein said network gateway server performs a handshake protocol with said computing device external to said monitored network via an encrypted serial communication tunnel;
    providing a non-transitory computer-readable medium storing processor executable instructions on said computing device external to said monitoring network, when executed by a hardware processor, the processor executable instructions causing the hardware processor to perform:

receiving collected data from said first and second collection layers;

analyzing said data; and in response to determining that a monitored element is vulnerable to cyber-attack or is under cyber-attack, sending instructions to said monitored network to block said vulnerable to cyber-attack or performing cyber-attack element using said second collection layer encrypted serial communication tunnel, wherein said instructions further comprising using said analysis of said monitored network to create a logic map comprising information of the connections between the entities in the network.

11. The method of claim 10 wherein said instructions further comprising using said analysis of said monitored network to create a physical connections map comprising information of the connections between the entities in the network.

12. The method of claim 11 wherein said instructions further comprise visualization of said network to a user.

13. The method of claim 10 wherein said monitored element is a physical security elements or said monitored network is a control system network.

14. The method of claim 10 wherein said instructions allow a centralized management of said collected and analyzed information and provides a user interface comprising a visualization of said information.

15. The method of claim 10 wherein said instructions allow maintaining a database of historical information of each monitored element.

16. The method of claim 10 wherein said monitored elements are blocked by default unless authorized.

17. The method of claim 16 wherein said blocking is full or partial according to customized privileges.

* * * * *